United States Patent
Yamaguchi et al.

(10) Patent No.: US 12,242,179 B2
(45) Date of Patent: Mar. 4, 2025

(54) REFLECTIVE SCREEN, REFLECTIVE SCREEN UNIT, AND VIDEO DISPLAY DEVICE

(71) Applicant: Dai Nippon Printing Co., Ltd., Tokyo (JP)

(72) Inventors: Sunao Yamaguchi, Tokyo (JP); Masashi Hiromitsu, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 337 days.

(21) Appl. No.: 17/906,264

(22) PCT Filed: Mar. 26, 2021

(86) PCT No.: PCT/JP2021/012931
§ 371 (c)(1),
(2) Date: Mar. 30, 2023

(87) PCT Pub. No.: WO2021/205907
PCT Pub. Date: Oct. 14, 2021

(65) Prior Publication Data
US 2023/0266655 A1    Aug. 24, 2023

(30) Foreign Application Priority Data

Apr. 7, 2020    (JP) .................................. 2020-068852

(51) Int. Cl.
*G03B 21/602* (2014.01)
(52) U.S. Cl.
CPC .................................. *G03B 21/602* (2013.01)
(58) Field of Classification Search
CPC ............................................. G03B 21/56–608
See application file for complete search history.

(56) References Cited

U.S. PATENT DOCUMENTS

| 6,726,859 B2 | 4/2004 | Suzuki et al. |
| 2005/0270643 A1 | 12/2005 | Yoshikawa et al. |

(Continued)

FOREIGN PATENT DOCUMENTS

| EP | 1 324 113 A1 | 7/2003 |
| JP | H04-322202 A | 11/1992 |

(Continued)

OTHER PUBLICATIONS

International Search Report and Written Opinion (Application No. PCT/JP2021/012931) dated Jun. 1, 2021 (with English translation).

*Primary Examiner* — Leon W Rhodes, Jr.
(74) *Attorney, Agent, or Firm* — BURR PATENT LAW, PLLC (57) ABSTRACT

A reflective screen including a lens layer having a Fresnel lens shape with a plurality of unit lenses and a reflective layer formed on the unit lenses to reflect light. The unit lenses protrude from a video source side to a back surface side in the thickness direction of the lens layer, the lens layer has a flat edge section where a portion of the back surface side serves as a flat surface, and h1min−h2>0 is satisfied, where h1min is the minimum height distance in the thickness direction of the lens layer from a position of the lens layer most on the video source side to a position of the unit lenses most on the back surface side, and h2 is the height which is the distance from the flat surface of the flat section to the position of the unit lenses most on the back surface side.

9 Claims, 10 Drawing Sheets

(56) References Cited

U.S. PATENT DOCUMENTS

| | | | |
|---|---|---|---|
| 2006/0103931 A1* | 5/2006 | Yakushiji | G03B 21/625 |
| | | | 359/454 |
| 2007/0165303 A1* | 7/2007 | Osawa | G02B 3/08 |
| | | | 359/457 |
| 2010/0079861 A1 | 4/2010 | Powell | |
| 2017/0255086 A1 | 9/2017 | Zhao | |

FOREIGN PATENT DOCUMENTS

| | | |
|---|---|---|
| JP | 2005-345839 A | 12/2005 |
| JP | 2013-171114 A | 9/2013 |
| JP | 2015-072475 A | 4/2015 |
| WO | 02/27399 A1 | 4/2002 |

\* cited by examiner

REFLECTIVE SCREEN, REFLECTIVE SCREEN UNIT, AND VIDEO DISPLAY DEVICE

TECHNICAL FIELD

The present invention relates to a reflective screen which displays by reflecting projected video light, a reflective screen unit including this reflective screen, and a video display device including this reflective screen unit.

BACKGROUND ART

Conventionally, a reflective screen has been disclosed which forms a reflective layer on a lens layer having a Fresnel lens shape in which a plurality of unit lenses are arranged in order to favorably display video light projected from a short-focus type video source (for example, refer to Patent Document 1).

Patent Document 1: Japanese Unexamined Patent Application, Publication No. 2013-171114

DISCLOSURE OF THE INVENTION

Problems to be Solved by the Invention

In the aforementioned reflective screen, a bezel is joined to the video source side, and a support plate is joined to the back surface side. The reflective screen is joined with the bezel and support plate by a junction layer (adhesive, glue, etc.). However, since the unit lense having a substantially triangular cross-sectional shape is presented at the back surface side of the reflective screen, unevenness caused by the uneven shape of the unit lens is formed at the back surface side of the junction layer laminated on the back surface side of the reflective screen. For this reason, it is not possible to sufficiently adhere the reflective screen and support plate due to the unevenness of the back surface side of the junction layer, and there have been cases where both peel apart. An object of the present invention is to provide a reflective screen which improves adhesion with a support plate, and a reflective screen unit and video display device including this.

Means for Solving the Problems

The present invention solves the problem with the following such solution. It should be noted that, for facilitating understanding, the reference numbers corresponding to the embodiment of the present invention will be attached and explained; however, it is not to be limited thereto. In addition, the configurations explained by attaching reference numbers may be improved as appropriate, and at least part may be substituted with other components.

A first aspect of the present invention relates to a reflective screen (10) which observably displays by reflecting video light projected from a video source, the reflective screen including: a lens layer (11) having a Fresnel lens shape in which a plurality of unit lenses (111) are arranged; and a reflective layer (12) which is formed on the unit lens of the lens layer, and reflects light, in which the unit lens is convex towards a back surface side from a video source side in a thickness direction of the lens layer, a flat part (114) at which a part of a back surface side becomes a flat surface (114f) is formed in at least an edge of the lens layer, and in a thickness direction of the lens layer, a smallest lens height h1min of a lens height h1, which is a distance from a position that is a most video source side of the lens layer until a position that a most back surface side of the unit lens, and a height h2 which is a distance from the flat surface of the flat part until a position which is a most back surface side of the unit lens satisfy a relationship (h1min−h2)>0.

A second aspect of the present invention relates to the reflective screen as described in the first aspect, in which the flat surface of the flat part has a relationship of 10 µm≤ (h1min−h2)≤90 µm, in the lens layer formed from a position that is a most back surface side of the unit lens until a position in front of the point that is most video source side of the unit lens.

A third aspect of the present invention relates to the reflective screen as described in the first aspect, in which the half surface of the half part has a relationship of 20 µm≤ (h1min−h2)≤60 µm, in the lens layer formed from a position that is a most video source side of the unit lens until a position in front of the point that is most video source side of the lens layer.

A fourth aspect of the present invention relates to the reflective screen as described in the first aspect, in which the lens layer is an oblong rectangular shape viewed from a video source side, and the flat part is formed in at least one edge on a long side of the lens layer.

A fifth aspect of the present invention relates to the reflective screen as described in the fourth aspect, in which the lens layer includes a first long side that is more to a lens surface side than an non-lens surface in an arrangement direction of the unit lens, and a second long side that is more to the non-lens surface side than the lens surface in the arrangement direction of the unit lens, and the flat part is formed at one edge on the first long side. A sixth aspect of the present invention relates to the reflective screen as described in the fourth aspect, in which the flat part is formed at an edge on a side separated from an optical center of a Fresnel lens shape of the lens layer.

A seventh aspect of the present invention relates to the reflective screen as described in the first aspect, in which the lens layer is an oblong rectangular shape viewed from a video source side, and the flat part is formed in at least one edge of a long side of the lens layer and at least one edge of a short side of the lens layer. An eighth aspect of the present invention relates to a reflective screen unit including: the reflective screen as described in any one of the first to seventh aspects; a bezel (20) provided to a video source side of the reflective screen, and covering at least the flat part; a support plate (30) provided to a back surface side of the reflective screen, and maintaining flatness of a screen of the reflective screen; and a junction layer (40) provided between the reflective screen and the support plate, and joining the reflective screen and the support plate. A ninth aspect of the present invention relates to a video display device including: the reflective screen unit as described in the eighth aspect; and a video source which projects video light towards the reflective screen unit.

Effects of the Invention

According to the present invention, since it is possible to improve the adhesion between the support plate and reflective screen, it is possible to suppress peeling apart of both.

PREFERRED MODE FOR CARRYING OUT THE INVENTION

Figure 1A:
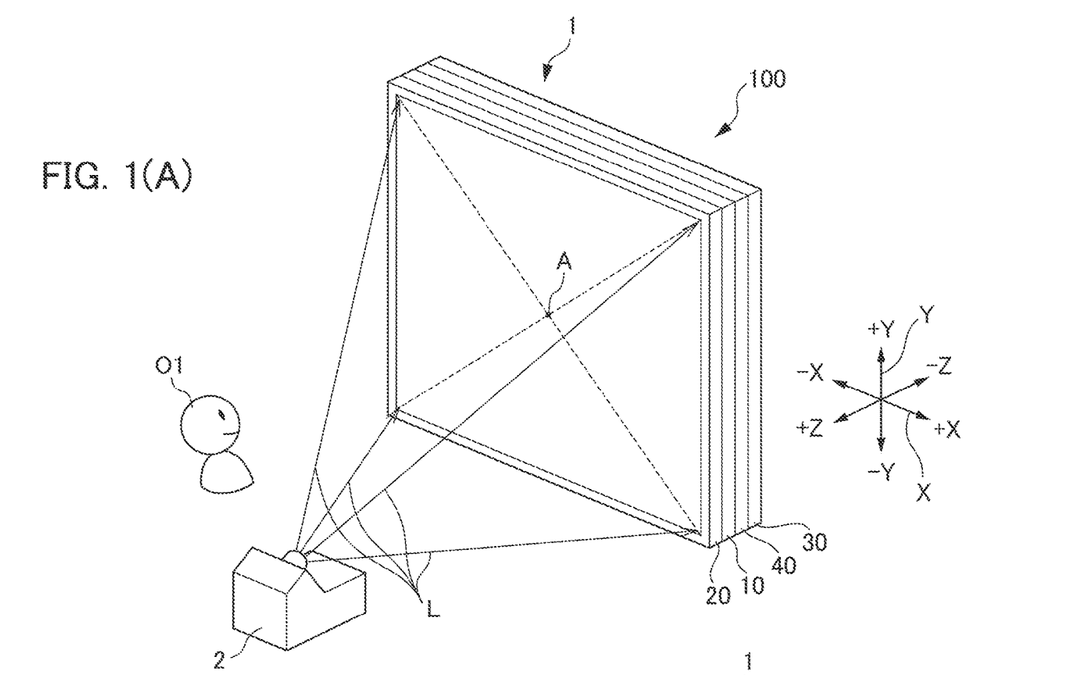
FIGS. 1(A) and 1(B) are views showing a video display device 100 of a first embodiment.
Figure 1B:
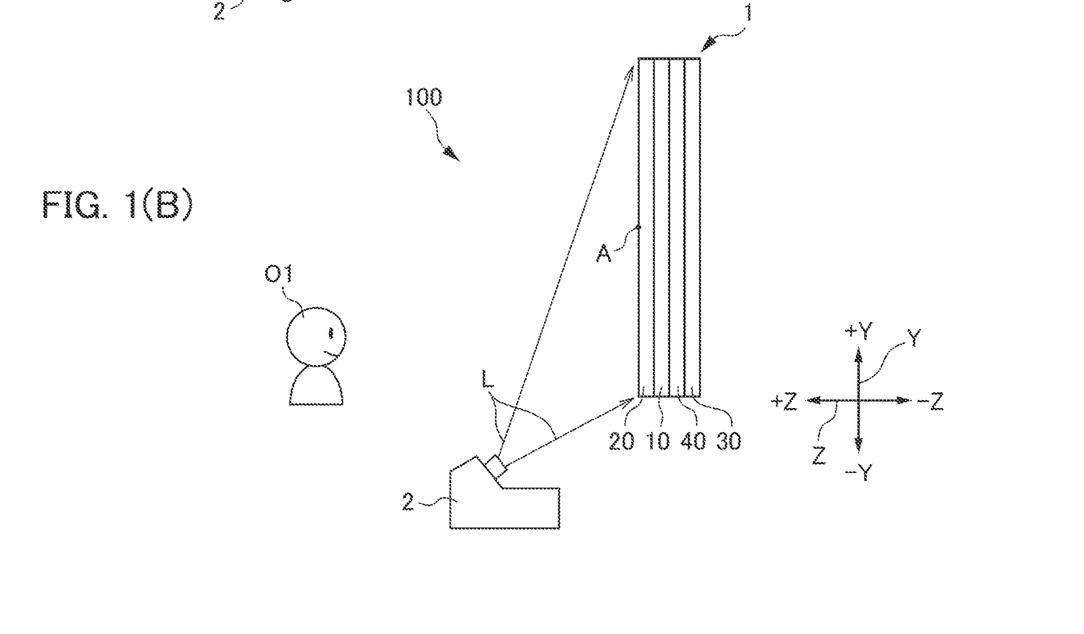

Hereinafter, an embodiment of the present invention will be explained by referencing the drawings, etc. It should be noted that each diagram shown below including FIGS. 1(A) and 1(B) are schematically shown views, and the size and shape of each part are exaggerated as appropriate in order to facilitate understanding. In the present disclosure, the terminology specifying the shape and geometrical conditions, for example, the terminology of parallel, orthogonal, etc., in addition to when having a strict meaning, also include states having an extent of error exerting the same optical function and can be regarding as parallel or orthogonal.

In the present disclosure, the numerical value such as of the dimensions of each member described, material names, etc. are examples as an embodiment, are not to be limited thereto, and may be selected and employed as appropriate. In the present disclosure, screen surface indicates a surface which becomes a planar direction of the screen when viewing the screen as a whole, and is parallel to the screen (display surface) of the screen.

First Embodiment

FIGS. 1(A) and 1(B) are views showing a video display device 100 of the first embodiment. FIG. 1(A) is a perspective view of the video display device 100. FIG. 1(B) is a diagram viewing the video display device 100 from a lateral face. As shown in FIGS. 1(A) and 1(B), the video display device 100 includes a reflective screen unit 1, a video source 2, etc. The reflective screen unit 1 includes a reflective screen 10 (described later), etc., and displays video on the screen (display surface) of a video source side by reflecting video light L projected from the video source 2. Details of the reflective screen unit 1 will be described later.

Figure 5:
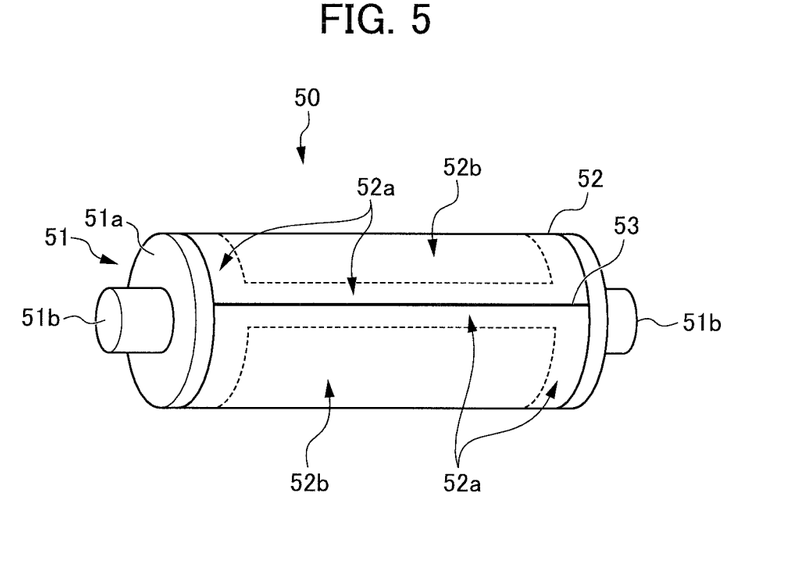
FIG. 5 is a perspective view showing an appearance of a roll plate 50.
Figure 6A:
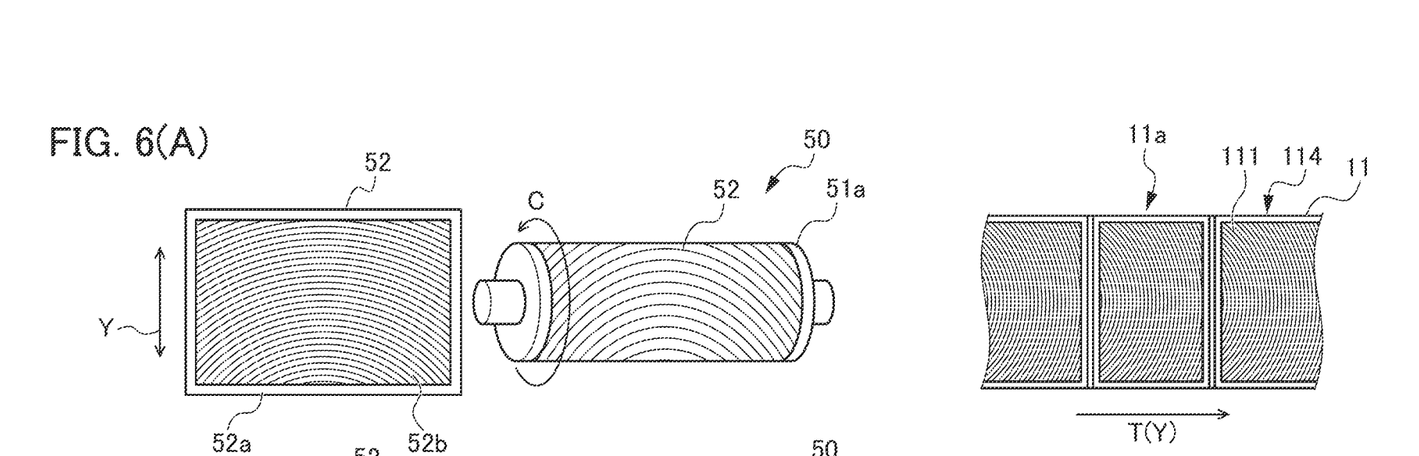
FIGS. 6(A) and (B) are views for explaining a pasting direction of a mold plate 52 of the roll plate 50.
Figure 6B:
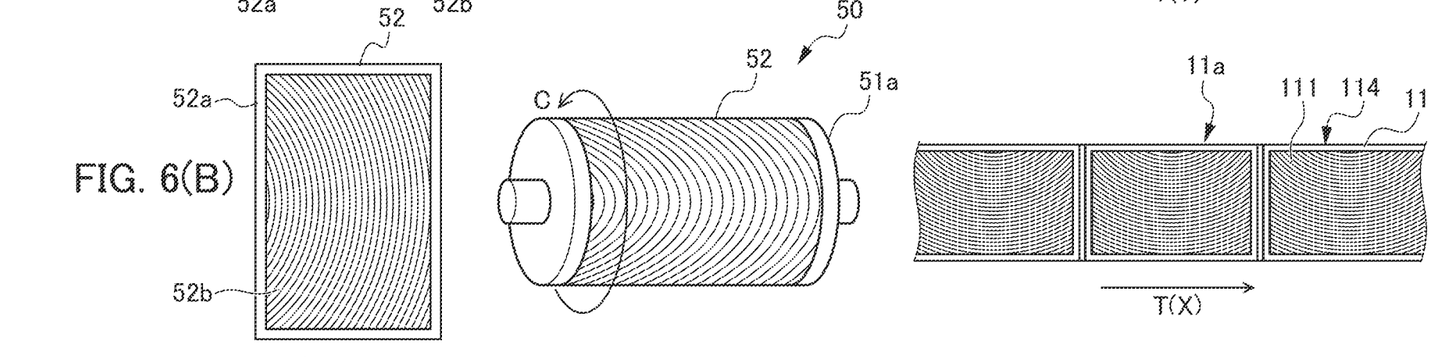

It should be noted that, in the reflective screen unit 1 and reflective screen 10, up/down/left/right are not particularly limited; however, in each of the drawings except for FIG. 5 and FIGS. 6(A) and 6(B), XYZ orthogonal coordinates are shown as appropriate. In this coordinate system, the screen left/right direction (horizontal direction) of the reflective screen unit 1 (reflective screen 10) is defined as the X direction, the screen up/down direction (vertical direction) is defined as the Y direction, and the thickness direction of the reflective screen unit 1 is defined as the Z direction. The screen of the reflective screen unit 1 is parallel to the XY plane, and the thickness direction (Z direction) of the reflective screen unit 1 is orthogonal to the screen of the reflective screen unit 1.

In addition, viewing from an observer O1 positioned in the front direction on a video source side of the reflective screen unit 1, a direction facing the right side in the screen left/right direction is defined as the +X direction, and a direction facing the left side is defined as the −X direction. A direction facing upwards in the screen up/down direction is defined as the +Y direction, and a direction facing downwards is defined as the −Y direction. A direction facing the video source side from the back surface side (rear side) in the thickness direction is defined as the +Z direction, and a direction facing the back surface side from the video source side is defined as the −Z direction. Furthermore, in the following explanation, the screen up/down direction, screen left/right direction and thickness direction, unless otherwise specified, correspond to the screen up/down direction (vertical direction), screen left/right direction (horizontal direction), and thickness direction (depth direction) in the usage state of the reflective screen unit 1. These respective directions are respectively parallel to the Y direction, X direction and Z direction. It should be noted that "~ direction" may also be called "~ side" in the present disclosure.

The video source 2 is a video projection device (projector) which projects video light L onto the reflective screen unit 1. The video source 2 of the present embodiment is a short-focus type projector. When viewing the screen (display region) of the reflective screen unit 1 from a front direction (normal vector direction of the screen surface) of the video source side (+Z side) in the usage state of the video display device 100, the video source 2 is the center in the screen left/right direction of the reflective screen unit 1, and is installed more to a downward side in the vertical direction (−Y side) than the screen of the reflective screen unit 1.

The video source 2, in the depth direction (Z direction), can project the video light L obliquely, from a position at which the distance from the surface on the video source side (+Z side) of the reflective screen unit 1 is drastically closer compared to a conventional general-purpose projector. Therefore, compared to the conventional general-purpose projector, the video source 2 has a short projection distance to the reflective screen unit 1, the incident angle of the projected video light incident on the reflective screen unit 1 is large, and the amount of change of the incident angle (amount of change from the minimum value to maximum value) is also large.

The reflective screen unit 1 displays video by reflecting the video light L projected by the video source 2 towards the observer O1 side positioned on the video source side (+Z side). The screen (display region) of the reflective screen unit 1 is a rectangular shape in which the long side direction viewing from the observer O1 side of the video source side (+Z side) is the screen left/right direction (X direction) in the usage state. In other words, the screen of the reflective screen unit 1 (reflective screen 10) of the present embodiment is an oblong rectangular shape viewed from the video source side.

Figure 2:
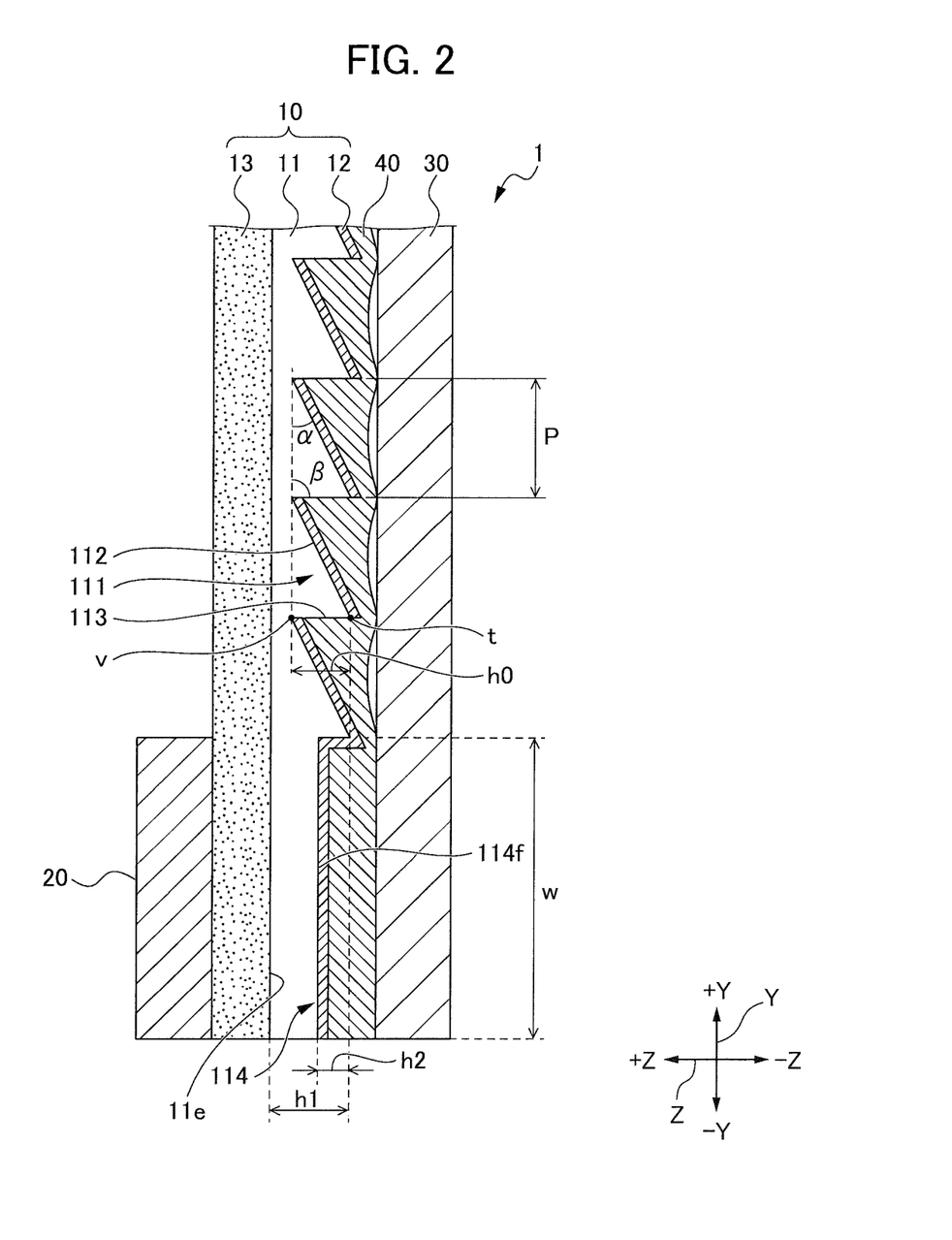
FIG. 2 is a view for explaining a layer configuration of a reflective screen unit 1 and reflective screen 10 of a first embodiment.
Figure 3:
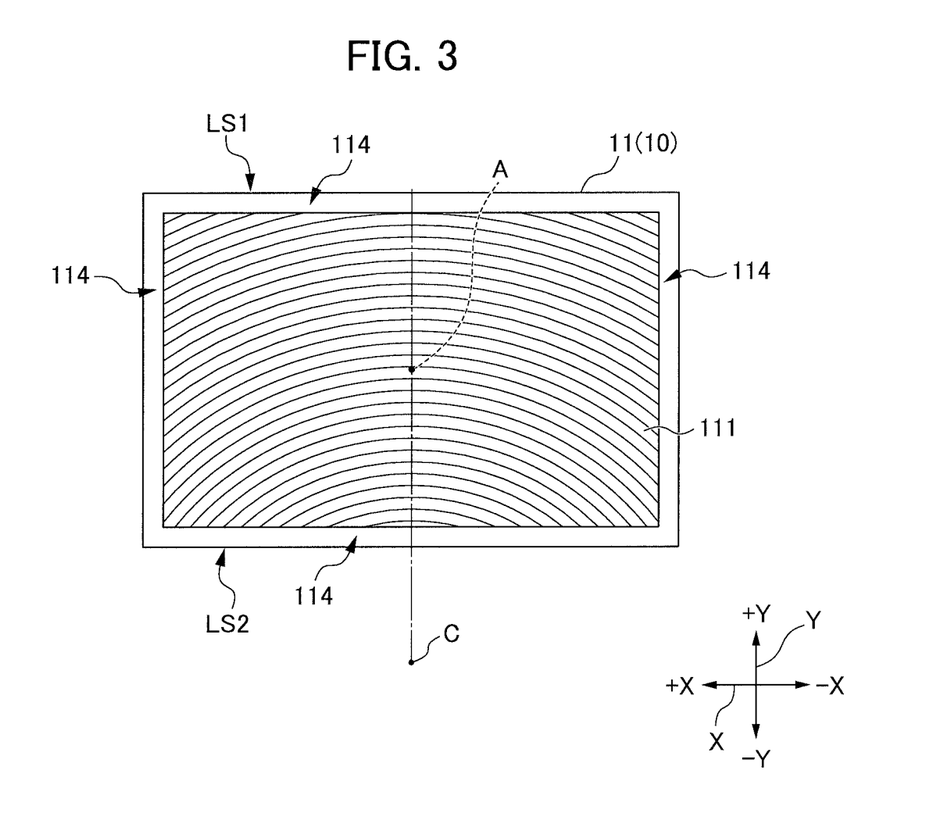
FIG. 3 is a diagram viewing a lens layer 11 of the reflective screen 10 from a back surface side (−Z side)
Figure 4:
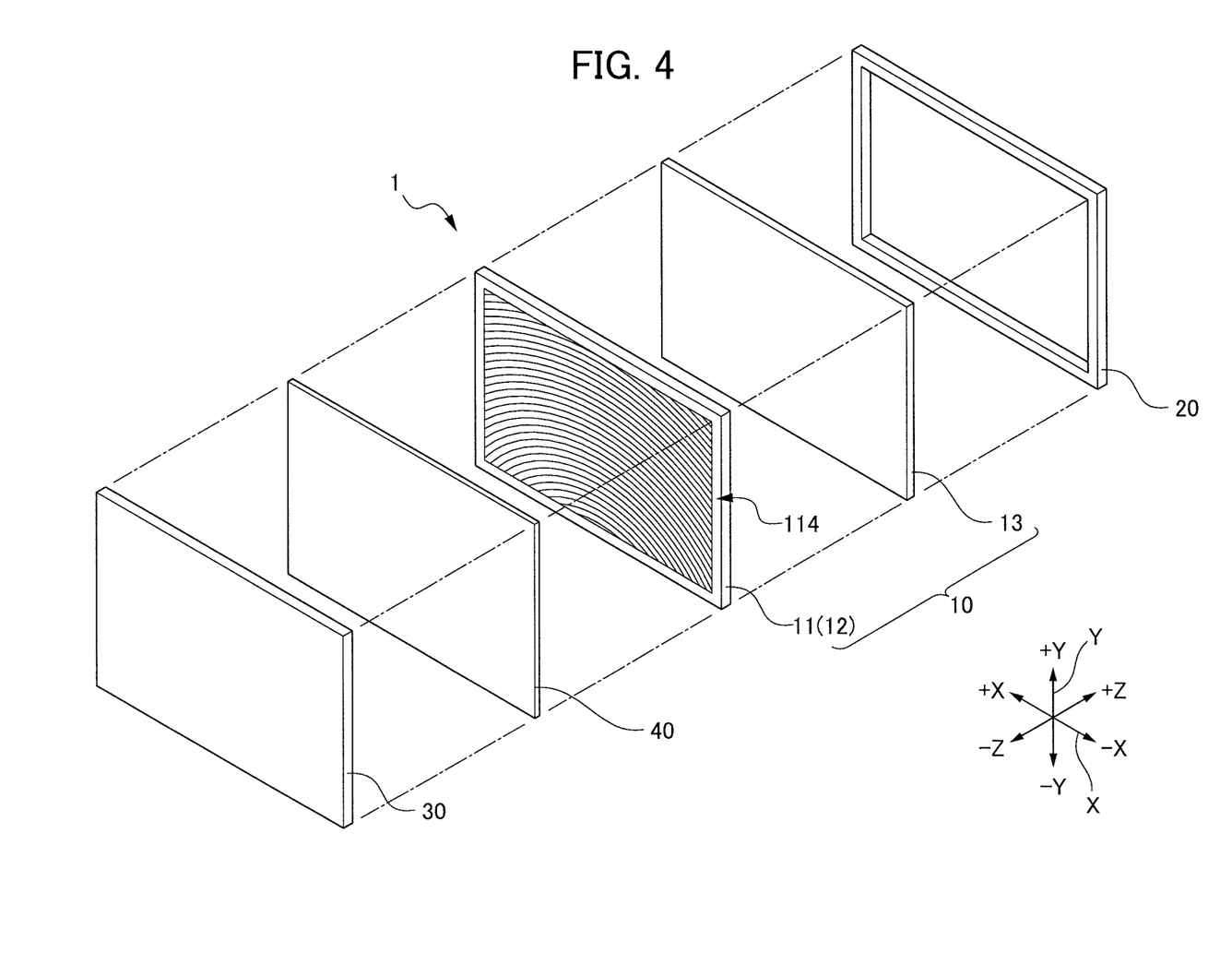
FIG. 4 is an exploded perspective view of the reflective screen unit 1.

FIG. 2 is a view for explaining a layer configuration of the reflective screen unit 1 and reflective screen 10 of the first embodiment. FIG. 2 shows enlarged a part of the cross-section (Y-Z plane) parallel to the thickness direction (Z direction), which is parallel to the arrangement direction of the unit lens 111 (described later), passing through the geometrical center A (refer to FIG. 3) of the reflective screen 10, which is a region on the lower side (−Y side) of the reflective screen unit 1. FIG. 3 is a diagram viewing the lens layer 11 of the reflective screen 10 from a back surface side (−Z side). It should be noted that, in FIG. 3, illustration of a reflective layer 12 provided at the back surface side of the lens layer 11 is omitted. FIG. 4 is an exploded perspective view of the reflective screen unit 1. FIG. 4 is a drawing viewing the reflective screen unit 1 from a back surface side (−Z side), and the appearance, shape, etc. of each part is simplified.

As shown in FIG. 2 and FIG. 4, the reflective screen unit 1 includes, in order from the video source side (+Z side), a bezel 20, the reflective screen 10, a junction layer 40 and a support plate 30.

<Reflective Screen 10>

The reflective screen 10 is a sheet member (laminate body) which observably displays by reflecting the video light projected from the video source 2. The reflective screen 10 of the present embodiment includes a lens layer 11, reflective layer 12 and light diffusion layer 13, as shown in FIG. 2. It should be noted that the reflective screen 10 is sufficient so long as including at least the lens layer 11 and reflective layer 12.

<Lens Layer 11>

The lens layer 11 is a sheet material having optical transparency formed on the back surface side (−Z side) of the light diffusion layer 13. The lens layer 11, as shown in FIG. 3, has a circular Fresnel lens shape in which a plurality of unit lenses 111 are arranged concentrically around a point C. In the circular Fresnel lens shape, the point C serving as the optical center (Fresnel center) is outside the region of the screen (display region) of the reflective screen 10, and positioned at the lower side (−Y side) of the reflective screen 10. In the present embodiment, the optical center C is provided on a parallel line (dashed line in FIG. 3) to the screen up/down direction (Y direction) passing through the geometrical center A of the reflective screen 10, as shown in FIG. 3, and the circular Fresnel lens shape is formed with axial symmetry relative to this line (dashed line in FIG. 3).

As shown in FIG. 2, the unit lens 111 has a shape that is substantially triangular in a cross section parallel to the arrangement direction (Y direction) of the unit lenses 111, which is parallel to the thickness direction (Z direction) which is orthogonal to the screen surface. The unit lens 111 is formed so as to be convex towards the back surface side (−Z side) from the video source side (+Z side). The unit lens 111 includes the lens surface 112, and a non-lens surface 113 which is opposite (adjacent) the lens surface 112 in the arrangement direction of the unit lenses 111. In the usage state of the reflective screen unit 1, the lens surface 112 of the unit lens 111 is positioned more to the upper side (+Y side) in a vertical direction than the non-lens surface 113 to interpose the apex t. The apex t indicates a position which becomes the most back surface side (−Z side) of the unit lens 111.

As shown in FIG. 2, in the unit lens 111, the angle formed by the lens surface 112 with the surface parallel to the screen surface (dashed line (X-Y plane) in drawing) is α. The angle formed by the non-lens surface 113 with a surface parallel to the screen surface is β (β>α). The arrangement pitch of unit lenses 111 is P. In addition, the lens height of the unit lens 111 is h0. The lens height h0 is the distance until the apex t from a point v which is the most video source side of the unit lens 111. The point v indicates the position which becomes a valley bottom between unit lenses 111 from the apex t in the thickness direction of the reflective screen 10.

It should be noted that, in FIG. 2, the arrangement pitch P, angles α, β of the unit lens 111 are indicated so as to be constant in the arrangement direction of the unit lenses 111. However, in the unit lens 111, the arrangement pitch P, etc. are actually constant; however, it is configured so that the angle α becomes gradually larger as distancing from the point C (refer to FIG. 3) serving as the Fresnel center, in the arrangement direction of the unit lenses 111. In other words, the lens height h0 of the unit lens 111 becomes gradually larger as distancing from the point C serving as the Fresnel center, in the arrangement direction of the unit lenses 111.

In addition, not limiting to the above-mentioned configuration, the arrangement pitch P may be a configuration gradually varying along the arrangement direction of the unit lenses 111. In other words, the arrangement pitch P is variable as appropriate according to the size of the pixels of the video source 2 projecting the video light, the projection angle of the video source 2 (incident angle of video light on the screen surface of the reflective screen 10), screen size of the reflective screen 10, refractive index of each layer, etc.

As shown in FIG. 3, a flat part 114 at which the back surface side is a flat surface (114f) is formed at each edge in the screen left/right direction (X direction) and screen up/down direction (Y direction) of the lens layer 11 (reflective screen 10). The flat part 114 is provided so as to surround the arranged unit lenses 111, and formed from the same material as the unit lens 111. In other words, in the reflective screen 10, the unit lens 111 and flat part 114 are integrally formed. The lens layer 11 shown in FIG. 3 includes, in an arrangement direction of the unit lenses 111, an edge LS1 on a first long side which is more to a lens surface 112 (refer to FIG. 2) side than a non-lens surface 113 (refer to FIG. 2), and an edge LS2 on a second long side which is more to the non-lens surface 113 side than the lens surface 112. In the lens layer 11 in which the unit lenses 111 of the cross-sectional shape shown in FIG. 2 are arranged in the screen up/down direction (Y direction), it is desired for the flat part 114 to be formed at least in the edge LS1 of the first long side. In other words, it is desired for the flat part 114 to form at the edge on a side distanced from the point C serving as the optical center of the lens layer 11. By establishing the flat part 114 formed at the edge LS1 on the +Y side of the lens layer 11 as the peeling start part upon forming the flat part 114 at the edge LS1 on the first long side, and peeling the lens layer 11 from the forming die, it is possible to more easily and smoothly peel the lens layer 11 from the forming die.

In the reflective screen 10 of the first embodiment, a flat surface 114f of the flat part 114 is formed from the apex t which is the most back surface side of the unit lens 111 until a position in front of the point v which is the most video source side of the unit lens 111, in the thickness direction (Z direction) of the lens layer 11, as shown in FIG. 2. "Position in front of the point v" indicates the flat surface 114f of the flat part 114 being formed more to the back surface side (−Z side) than the point v which is the most video source side of the unit lens 111, in the thickness direction of the lens layer 11.

In the reflective screen 10 of the first embodiment, in the thickness direction of the lens layer 11, the lowest height h1min of the height h1, which is the distance from the position 11e that is the most video source side of the lens layer 11 until the apex t that is the most back surface side of the unit lens 111, and h2 which is the distance from the flat surface 114f until the apex t that is the most back surface side of the unit lens 111 satisfy the relationship of (h1min−h2)>0. In the lens layer 11 of the first embodiment, (h1min−h2) is preferably 10 to 90 μm, and more preferably 30 to 70 μm. The width w (refer to FIG. 2) of the flat part 114 depends on the screen size of the reflective screen 10; however, it is preferably set to within 10 mm. It should be noted that the above-mentioned dimensions and ranges are ultimately only examples, and are not to be limited thereto.

It should be noted that, as mentioned above, since the angles α of the unit lenses 111 are configured so as to become gradually larger as distanced from the point C which is the Fresnel center, the lens height h0 also becomes gradually larger accompanying this. In addition, the height h1 which is the distance from the position 11e of the lens layer 11 until the apex t of the unit lens 111 also gradually becomes larger as the lens height h0 becomes larger. For this reason, the flat part 114 is formed relative to the lowest height h1min so as to satisfy the relationship of (h1min−h2)>0. In addition, in the present embodiment, although (h1min−h2) defining the position of the flat part 114 is defined as the same value at edges in each direction of the screen, the value of (h1min−h2) may be set to different values in each direction of the screen as described later. The operation/function of the flat part 114 will be described later. The lens layer 11, for example, is formed from a UV ray-curing resin such as a highly light transparent urethane acrylate, polyester acrylate, epoxy acrylate, polyether acrylate, polythiol, or butadiene acrylate.

The lens layer 11 can be formed as a continuous lens sheet, by using a roll plate (described later). The plurality of unit lenses 111 are concentrically arranged in the lens layer 11 molded using the roll plate, whereby a circular Fresnel lens shape is formed in which the shape of a cross-section parallel to a direction orthogonal to the screen surface (thickness direction), which is parallel to the arrangement direction of the unit lenses 111, makes a substantially triangular shape. In addition, in the roll plate, by providing the flat surface 52a (described later) not forming an uneven shape for forming the unit lens 111 in portions corresponding with each edge in the screen left/right direction (X direction) and screen up/down direction (Y direction) of the lens layer 11, it is possible to form the flat part 114 at positions of the above-mentioned edges of the lens layer 11.

The lens layer 11, as described later, may be formed by a thermoplastic resin composition, or may be formed by an ionizing radiation-curing resin such as an electron beam curing resin. In addition, the lens layer 11 may be prepared from a press molding method or the like according to the Fresnel lens shape. In this case, the light diffusion layer 13, etc. may be laminated on the video source side via a junction layer (not illustrated). In addition, in the case of an extrusion molding method being possible, the lens layer 11 and light diffusion layer 13 may be formed in a state integrally laminated. Molding of the lens layer 11 (lens sheet 11a) will be described later.

<Reflective Layer 12>

The reflective layer 12 is a layer having an operation of reflecting light. The reflective layer 12 has sufficient height in order to reflect the light, and is formed at least on the lens surface 112 of the unit lens 111. In the present embodiment, the reflective layer 12 is formed on the lens surface 112, as shown in FIG. 2, and not formed on the non-lens surface 113. It should be noted that the reflective layer 12, so long as being a thinness of an order not reflecting light, may be formed on at least part of the non-lens surface 113. The reflective layer 12 can be formed by vapor depositing a metal having high light reflectivity such as aluminum, silver or nickel on the lens surface 112 of the lens layer 11 molded as a lens sheet. In addition, the reflective layer 12, for example, can be formed by sputtering metal having high light reflectivity such as aluminum, silver or chromium, or transcribing metallic foil of these. The reflective layer 12 may establish a thickness as appropriate according to the material or the like, so long as being able to secure sufficient thickness for reflecting light.

<Light Diffusion Layer 13>

The light diffusion layer 13 is a layer with a resin having light transparency as a base material, and containing a diffusing agent which diffuses light. The light diffusion layer 13 has a function of widening the viewing angle, and improving the in-plane uniformity of brightness. As the resin serving as the base material of the light diffusion layer 13, for example, PET (polyethylene terephthalate) resin, PC (polycarbonate) resin, MS (methylmethacrylate/styrene) resin, MBS (methylmethacrylate/butadiene/styrene) resin, TAC (triacetyl cellulose) resin, PEN (polyethylene naphthalate) resin, acrylic resins, etc. can be exemplified.

As the diffusing agent contained in the light diffusion layer 13, particles made from a resin such as, for example, acrylic resin, epoxy resin or silicon-based resin, inorganic particles, etc. can be exemplified. It should be noted that the diffusing agent may be used by combining an inorganic diffusing agent and an organic diffusing agent. The diffusing agent is substantially spherically, and preferably uses an agent having an average particle size of about 1 to 50 μm. The thickness of the light diffusion layer 13 may depend on the screen size of the reflective screen 10; however, it is preferably set on the order of 100 to 2000 μm, for example. It should be noted that, although not illustrated, a colored layer, top layer, etc. may be provided to the video source side (+Z side) of the light diffusion layer 13.

<Bezel 20>

The bezel 20 is a member arranged at the video source side (+Z side) of the reflective screen unit 1. As shown in FIG. 4, the bezel 20 is configured in a frame shape, so as to cover the region corresponding to the flat part 114 (region on outer side of dashed line in drawing) of the reflective screen 10. Hereinafter, a portion not covered by the bezel 20 of the reflective screen 10 may also be called "effective area". The bezel 20, for example, is configured from plastic, metal, wood or the like. It should be noted that the bezel 20 may be the shape of a box frame such that covers not only the flat part 114 of the reflective screen 10, but all lateral faces of the reflective screen unit 1.

<Support Plate 30>

The support plate 30 is a member arranged on the back surface side (−Z side) of the reflective screen 10 in the reflective screen unit 1. The reflective screen 10 and support plate 30 are joined via the junction layer 40 (described later). So long as the support plate 30 is a member establishing sufficient rigidity to support the reflective screen 10, the material thereof is not particularly limited. As the support plate 30, for example, it is possible to use a plate member made of a metal such as aluminum, or a plate member made of resin such as acrylic resin. In addition, as the support plate 30, a plate made of metal establishing the front/back surfaces as a thin plate of aluminum or the like, and including a honeycomb structure configured from thin plates of aluminum or the like as a core (for example, honeycomb panel) may be used. The support plate 30 is preferably a member without optical transparency, from the viewpoint of suppressing a reflection of outside light, and a decline in contrast due to outside light.

<Junction layer 40>

The junction layer 40 is a layer having a function of integrally joining the reflective screen 10 and the support plate 30. The junction layer 40 is formed by adhesive, glue or the like. As the junction layer 40, for example, it is possible to use a UV curable resin, thermoset resin, etc. The junction layer 40 is desirably black or has low optical transparency. It should be noted that, although FIG. 4 shows the junction layer 40 in sheet form, the adhesive, glue or the like serving as the junction layer 40 is coated to the back surface side (−Z side) of the reflective screen 10. When coating the junction layer 40 on the back surface side (−Z side) of the reflective screen 10, unevenness caused by the cross-sectional shape (substantially triangular shape) of the unit lens 111 comes to be formed on the surface of the back surface side (−Z side) of the junction layer 40, within the effective area of the reflective screen 10, as shown in FIG. 2.

In the reflective screen 10 of the aforementioned first embodiment, the flat part 114 is formed at each edge of the screen left/right direction (X direction) and screen up/down direction (Y direction) on the back surface side (front side in drawing) of the lens layer 11, as shown in FIG. 3. For this reason, in the case of joining the support plate 30 to the reflective screen 10 via the junction layer 40, even if configuring the uneven shape corresponding to the unit lenses 111 of the lens layer 11 to be formed at the back surface of the junction layer 40 provided at the back surface side (−Z side) of the reflective screen 10 as shown in FIG. 2, it is possible to sufficiently adhere the reflective screen 10 and support plate 30 by the junction layer 40 at the flat part 114 formed at each edge. In this way, according to the reflective screen 10 of the first embodiment, since it is possible to improve adhesion with the support plate 30 by the flat surface 114f of the flat part 114, it is possible to suppress peeling apart of both after pasting.

<Roll Plate 50>

Next, the roll plate 50 molding the lens layer 11 (refer to FIG. 2) will be explained. FIG. 5 is a perspective view showing the appearance of the roll plate 50. FIGS. 6(A) and (B) are views for explaining a pasting direction of the mold plate 52 of the roll plate 50. The screen up/down direction (Y direction) and screen left/right direction (X direction) of the mold plate 52 shown in FIGS. 6(A) and (B) match the screen up/down direction (Y direction) and screen left/right direction (X direction) of the lens layer 11 (reflective screen 10) shown in FIG. 3.

As shown in FIG. 5, the roll plate 50 includes a roll 51 and mold plate (forming die) 52. The roll 51 includes a columnar roll main body 51a, and a rotation shaft 51b which projects from an end face of the roll main body 51a along a shaft line. The roll 51 can revolve around the rotation shaft 51b. The roll main body 51a is a portion around which the mold plate 52 is wound. Since the roll main body 51a must secure rigidity, it is preferably configured with a ferrous material for mechanical structures. In addition, the roll main body 51a may be a cylindrical shape in which both sides have bottoms, from the viewpoint of weight reduction while ensuring the required rigidity. In addition, so that surface temperature adjustment is possible in the roll main body 51a, a circulation mechanism (not illustrated) of coolant, warm water, steam or high-temperature oil may be provided inside of the roll main body. It should be noted that the diameter of the roll main body 51a is on the order of 300 to 650 mm, for example. The roll length (width) of the roll main body 51a is on the order of 1650 to 1850 mm, for example.

The mold plate 52 is a sheet-like mold which transcribes an uneven shape corresponding to the circular Fresnel lens shape of the lens layer 11, relative to a resin composition described later. In FIG. 5, specific illustration of the uneven shape 52 making the mold is omitted. The mold plate 52 shown in FIG. 6(A) is pasted to the roll main body 51a so that the screen up/down direction (Y direction) becomes parallel to the circumferential direction C of the roll main body 51a. On the other hand, the mold plate 52 shown in FIG. 6(B) is pasted to the roll main body 51a so that the screen up/down direction (Y direction) is orthogonal to the circumferential direction C of the roll main body 51a.

When pasting the mold plate 52 to the roll main body 51a in the direction shown in FIG. 6(A), it makes a shape in which the long side ends in the screen up/down direction (Y direction) of the mold plate 52 face each other. For this reason, in the lens sheet 11a (described later) molded by the roll plate 50 shown in FIG. 6(A), the winding direction T to the winding roll (not illustrated) matches the screen up/down direction (Y direction), as shown on the right-side drawing in FIG. 6(A).

In addition, when pasting the mold plate 52 to the roll main body 51a in the direction shown in FIG. 6(B), it makes a shape in which the short side ends in the screen left/right direction (X direction) of the mold plate 52 face each other. For this reason, in the lens sheet 11a molded by the roll plate 50 shown in FIG. 6(B), the winding direction T to the winding roll matches the screen left/right direction (X direction), as shown on the right-side drawing in FIG. 6(B). It should be noted that, although FIGS. 5 and 6 show forms in which one mold plate 52 is wound on the roll 51, it may be a form in which a plurality of mold plates 52 are wound on the roll 51.

The mold plate 52 is pasted to the surface of the roll main body 51a, and a gap of the joint between ends is filled with resin 53, as shown in FIG. 5. The flat surface 52a not forming the uneven shape 52b for forming the unit lens 111 is provided to the mold plate 52. By providing the flat surface 52a to the mold plate 52, it is possible to form the flat parts 114 (refer to FIG. 2) at positions of each edge in the screen left/right direction and screen up/down direction of the lens layer 11 molded using the roll plate 50.

Figure 7A:
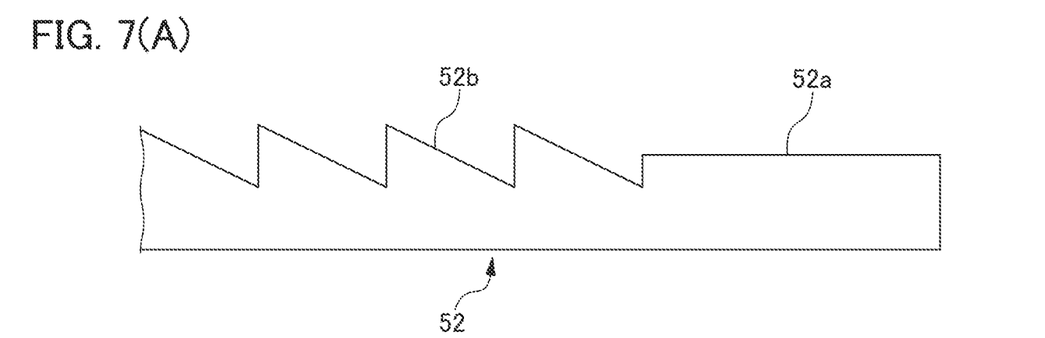
FIGS. 7(A) to (C) are views for explaining molding of the lens layer 11.
Figure 7B:
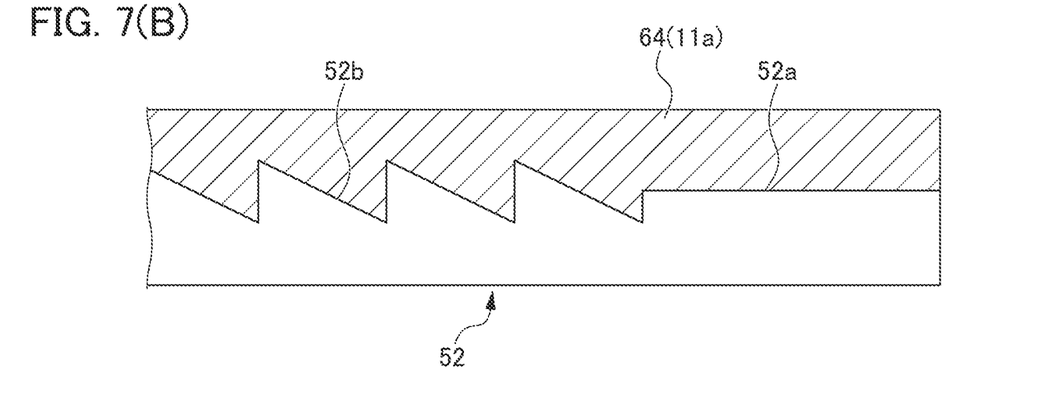
Figure 7C:
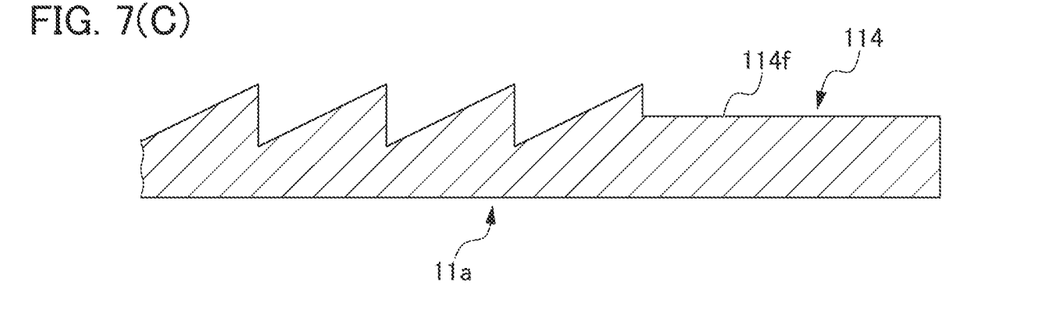

FIGS. 7(A) to (C) are views for explaining molding of the lens layer 11. FIGS. 7(A) to (C) are views for explaining the flat surface 52a and uneven shape 52b formed in the mold plate 52, and the surface shape of the lens layer 11 molded by the mold plate 52; therefore, part of the explanation using FIGS. 7(A) to (C) overlap the explanation of the manufacturing method (described later) of the lens layer 11 made using the roll plate 50. It should be noted that the lens layer 11 is molded by the mold plate 52 of substantially cylindrical shape wound on the roll main body 51a, as shown in FIG. 5; however, the mold plate 52 and lens sheet 11a during molding are illustrated planarly in FIGS. 7(A) to (C).

In the mold plate 52 used in molding of the lens layer 11, as shown in FIG. 7(A), the uneven shape 52b corresponding to the shape of the unit lens 111 is formed. In the mold plate 52, the flat surface 52a in which the uneven shape 52b is not formed is formed at the outer circumferential edge surrounding the uneven shape 52b, i.e. at positions corresponding to each edge in the screen up/down direction and screen left/right direction of the lens layer 11 (refer to FIG. 5).

As shown in FIG. 7(B), a molten thermoplastic resin composition 64 is filled to the surfaces of the flat surface 52a and the uneven shape 52b of the mold plate 52. The thermoplastic resin composition 64 cures by cooling. By peeling the molding from the surface of the mold plate 52 after the thermoplastic resin composition 64 cures, it is possible to obtain the lens sheet 11a in which the flat part 114 (flat surface 114f) is formed at each edge (only part of edges illustrated in corresponding drawing) in the screen up/down direction and screen left/right direction, as shown in FIG. 7(C).

<Manufacturing Method of Lens Layer 11>

Figure 8:
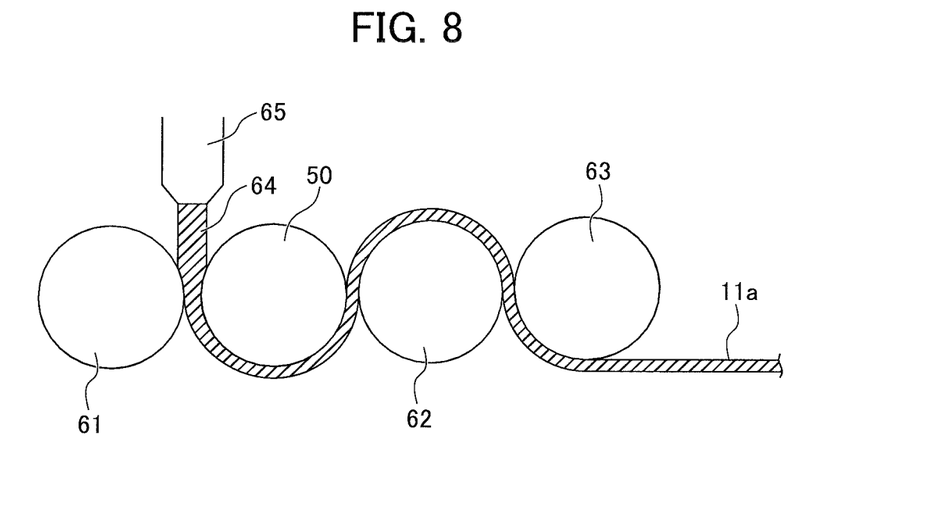
FIG. 8 is a view for explaining a manufacturing process of a lens sheet 11a made using the roll plate 50.

Next, a manufacturing method of the lens layer 11 made using the roll plate 50 will be explained. FIG. 8 is a view for explaining a manufacturing process of the lens sheet 11a (lens layer 11) made using the roll plate 50. As shown in FIG. 8, between the first roll 61 and the roll plate 50 arranged at a predetermined interval relative to this first roll 61, the molten thermoplastic resin composition 64 is made to influx from a nozzle 65. The thermoplastic resin composition 64 made to influx preferably makes a strip shape having a size (width) of the same degree as the width-direction size of the roll plate 50. It thereby becomes possible to supply material uniformly in the width direction of the roll plate 50.

The thermoplastic resin composition 64 is made to influx at a predetermined pressure between the first roll 61 and roll plate 50. The thermoplastic resin 64 is thereby filled into the unevenness (not illustrated) formed in the surface of the roll plate 50, cures from being cooled by the roll plate 50 and atmosphere (ambient air, operating environment of manufacturing device, etc.) and makes a shape following the unevenness of the roll plate 50. Then, the thermoplastic resin composition 64 is further cooled through the second roll 62 and third roll 63, and the shape is finally fixed. It is thereby possible to obtain the lens sheet 11a in which the circular Fresnel lens shape (refer to FIG. 3) in which a plurality of unit lenses 111 are concentrically arranged is formed. In the lens sheet 11a, the plurality of lens layers 11 are continuously formed as shown in the right-side drawings of FIGS. 6(A) and (B), for example.

The lens sheet 11a formed continuously in this way is wound on the winding roll (not illustrated). Then, by conducting processing such as punching or cutting on the lens sheet 11a, it is possible to obtain individually separated lens layers 11. In the case of the lens sheet 11a shown in FIG. 6(A), the winding direction comes to be the screen up/down direction (Y direction). In addition, in the case of the lens sheet 11a shown in FIG. 6(B), the winding direction comes to be the screen left/right direction (X direction). According to the winding direction of the lens sheet 11a, the height of the flat part 114 may vary. It should be noted that other processes may be further added to the manufacturing process of the lens layer 11 made using the roll plate 50, or a part of the manufacturing process may be substituted with other processes.

In the reflective screen 10 of the aforementioned first embodiment, since the flat part 114 is formed at each edge in the screen left/right direction (X direction) and screen up/down direction (Y direction) on the back surface side (front side in drawing) of the lens layer 11 as shown in FIG. 3, it becomes possible to easily peel the formed lens layer 11 from the forming die by establishing the flat part 114 as the peel starting part, in the manufacturing process of the lens layer 11.

In the lens sheet 11a molded by the roll plate 50, assuming a case of the unit lens 111 being formed until a region of the flat part 114 (flat part 114 not being formed in lens layer 11), it will be difficult to release the lens sheet 11a from the forming die (roll plate 50). In this case, if forcibly peeling off the lens sheet 11a from the forming die, since excessive force acts on the lens sheet 11a upon release, there is a possibility of the lens layer 11 whitening, and cracks occurring in the unit lens 111.

In contrast, in the reflective screen 10 of the present embodiment, since the flat part 114 (flat surface 114f) is formed at each edge of the lens layer 11 as described above, release from the forming die becomes easy due to establishing the flat part 114 as the peeling start part. If release from the roll plate 50 becomes easy, since excessive force will not act on the lens sheet 11a upon release, it is possible to suppress defects of the lens layer 11 whitening, or cracks occurring in the unit lens 111.

In the lens layer 11 molded on the lens sheet 11a, it is desirable for the flat part 114 (flat surface 114f) to be formed particularly at the edge LS1 (refer to FIG. 3) which is more to the lens surface 112 side than the non-lens surface 113 of the unit lens 111, among the edges of the lens layer 11. In other words, in the unit lens 111 shown in FIG. 2, the non-lens surface 113 and flat surface 114f of the flat part 114 are adjacent at the edge LS1 on the +Y side in the screen up/down direction (Y direction). For this reason, it is desirable for the flat part 114 to be formed at the edge LS1 on the +Y side.

By establishing the above such configuration, in the case of peeling the lens layer 11 (lens sheet 11a) from the forming die in the manufacturing process of the lens layer 11, it is possible to more easily and smoothly peel off the lens layer 11 from the forming die, by establishing the flat part 114 formed at this edge LS1 on the +Y side as the peeling start part.

In addition, in the molding of the lens sheet 11a by the roll plate 50, a gap of the joint between ends of the mold plate 52 is filled with resin 53 as shown in FIG. 5. In the lens sheet 11a, assuming a case of the unit lens 111 being formed until the region of the flat part 114, the resin 53 filled in the gap at the joint between ends may flow into the side of the unevenness forming the unit lens 111 by the capillary phenomenon. In this case, the resin 53 in the gap at the joint becomes thin, and there is concern over part of the mold plate 52 peeling from the roll plate 51 during molding. In addition, there is concern over part of the evenness forming the unit lens 111 being filled with resin, and molding defects, etc. occurring.

In contrast, in the mold plate 52 of the present embodiment, since the flat surface 52a is formed at each edge, the resin 53 filled in the gap of the joint between ends will hardly inflow to the side of the unevenness forming the unit lens 111 due to the capillary phenomenon. For this reason, it is possible to suppress defects of part of the mold plate 52 peeling from the roll 51 during molding, part of the unevenness forming the unit lens 111 being filled by resin, and molding defects occurring.

Second Embodiment

Figure 9:
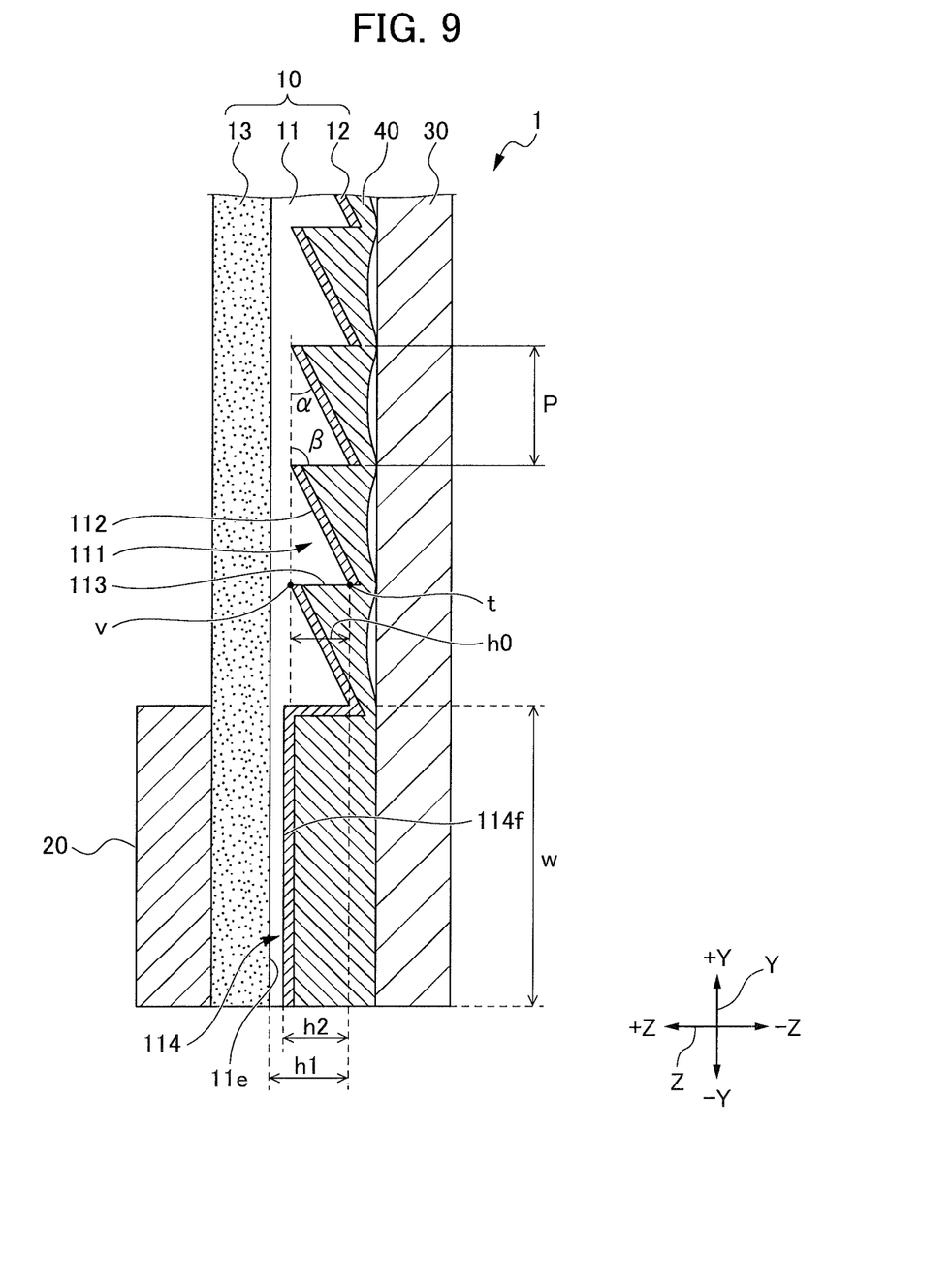
FIG. 9 is a view for explaining a layer configuration of a reflective screen unit 1 and reflective screen 10 of a second embodiment.

A reflective screen 10 of a second embodiment differs from the first embodiment in the range of forming the flat part 114 in the thickness direction of the lens layer 11. In the reflective screen 10 of the second embodiment, other configurations are identical to the first embodiment. For this reason, only the reflective screen 10 is illustrated in FIG. 9, and illustration of the entirety of the video display device 100 is omitted. In addition, in the explanations and drawings of the second embodiment, the same reference numbers as the first embodiment are attached to members, etc. equivalent to the first embodiment, and redundant explanations are omitted.

FIG. 9 is a view for explaining the layer configuration of the reflective screen unit 1 and reflective screen 10 of the second embodiment. In the reflective screen 10 of the second embodiment, the flat surface 114f of the flat part 114 is formed from the point v which is the most video source side of the unit lens 111 until the position 11e which is the most video source side of the lens layer 11, in the thickness direction of the lens layer 11, as shown in FIG. 9.

In the reflective screen 10 of the second embodiment, the lowest height h1min among heights h1, which is the distance from the position 11e that is the most video source side of the lens layer 11 until the apex t that is the most back surface side of the unit lens, and h2 which is the distance from the flat surface 114f until the apex t that is the most back surface side of the unit lens 111 in the thickness direction of the lens layer 11 satisfy the relationship (h1min−h2)>0. In the lens layer 11 of the second embodiment, (h1min−h2) is preferably 10 to 90 μm, and is more preferably 30 to 70 μm. In the reflective screen 10 of the second embodiment, other configurations thereof are identical to the first embodiment.

Also in the reflective screen 10 of the second embodiment, similarly to the first embodiment, since it is possible to improve adhesion with the support plate 30 by the flat surface 114f of the flat part 114, it is possible to suppress peeling of both after pasting. In addition, also in the lens layer 11 of the second embodiment, in the case of peeling the lens layer 11 (lens sheet 11a) from the forming die in the manufacturing process, it is possible to more easily and smoothly peel the lens layer 11 from the forming die, by establishing the flat part 114 formed at the edge LS1 on the +Y side as the peeling start part. Furthermore, according to the reflective screen 10 of the second embodiment, it is possible to make the amount of resin forming the lens layer 11 smaller than the first embodiment.

Although an embodiment of the present disclosure has been explained above, the present disclosure is not limited to the aforementioned embodiment, various modification and alterations are possible as in the modified embodiment described later, and these are also encompassed in the technical scope of the present disclosure. In addition, the effects described in the embodiment are merely listing the most preferred effects produced from the present disclosure, and are not limited to those described in the embodiment. It should be noted that the aforementioned embodiment and the modified embodiment described later can be used in combination as appropriate; however, a detailed explanation thereof is omitted.

Modified Embodiment

Figure 10A:
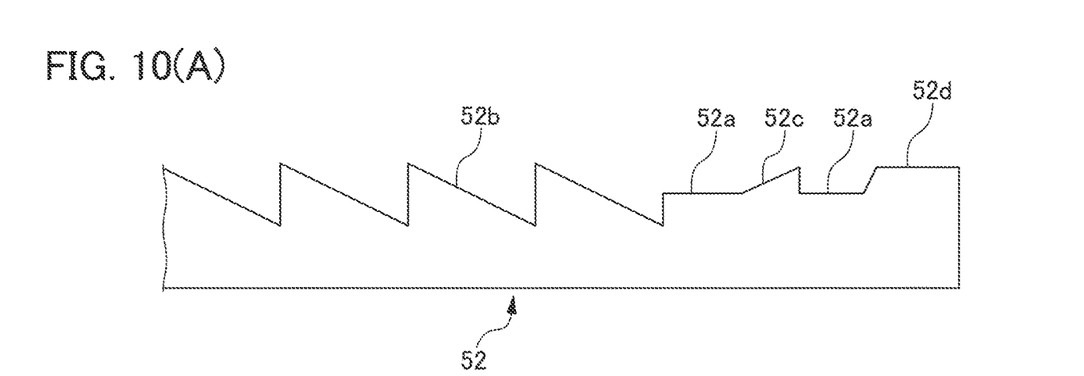
FIGS. 10(A) to (C) are views for explaining molding of a lens layer 11 of a modified embodiment.
Figure 10B:
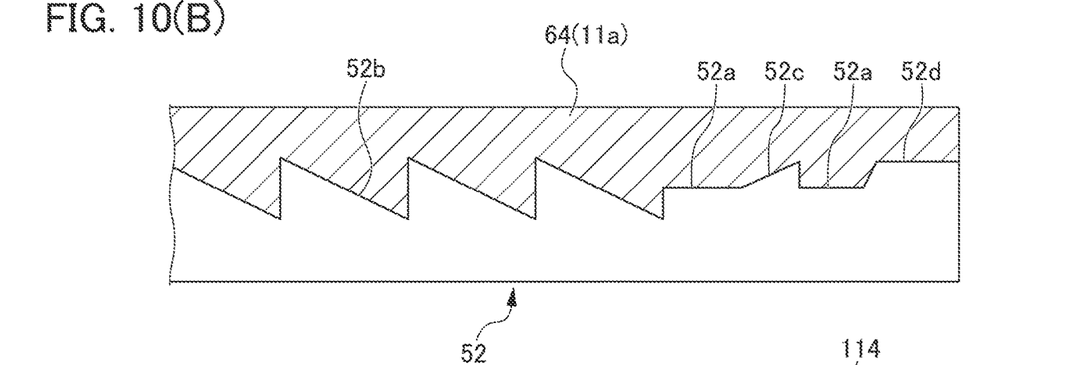
Figure 10C:
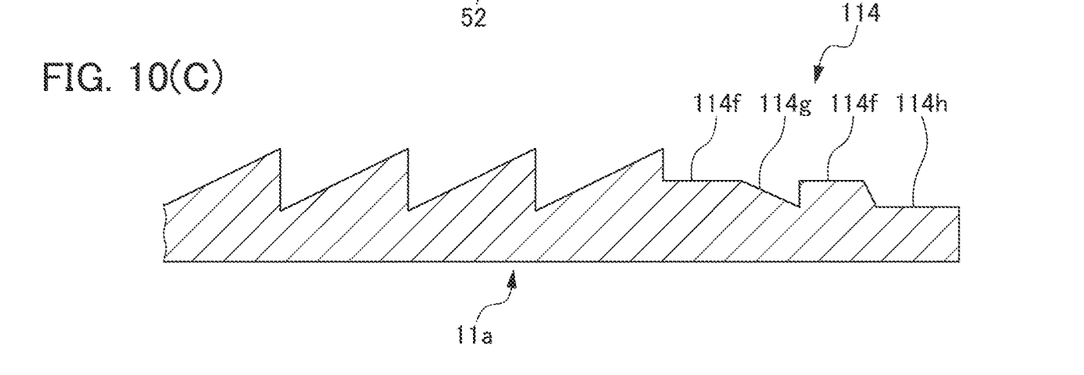

FIGS. 10(A) to (C) are views for explaining molding of the lens layer 11 of the modified embodiment. The reflective screen 10 of the modified embodiment differs from the first embodiment in the shape of the flat part 114. In the reflective screen 10 of the modified embodiment, other configurations are identical to the first embodiment. In addition, in the explanations and drawings of the second embodiment, the same reference numbers as the first embodiment are attached to members, etc. equivalent to the first embodiment, and redundant explanations are omitted. Also in FIGS. 10(A) to (C), the mold plate 52 and lens sheet 11a during molding are illustrated planarly.

As shown in FIG. 10(A), the mold plate 52 of the modified embodiment includes a flat surface 52a, protrusion 52c and bank part 52d. The protrusion 52c is a portion having a substantially triangular cross-sectional shape. The bank part 52d is a portion having a substantially trapezoidal cross-sectional shape. The protrusion 52c and bank part 52d are both portions projecting outwards from the flat surface 52a. Although not illustrated, the flat surface 52a, protrusion 52c and bank part 52d are formed at the outer circumferential edge surrounding the uneven shape 52b, i.e. position corresponding to each edge in the screen up/down direction and screen left/right direction of the lens layer 11, in the mold plate 52 of the modified embodiment. The protrusion 52c and bank part 52d extend along each edge.

Using the mold plate 52 of the present embodiment, the molten thermoplastic resin composition 64 is filled to the surface of the flat surface 52a, uneven shape 52b, protrusion 52c and bank part 52d of the mold plate 52, as shown in FIG. 10(B). Then, when peeling the molding from the surface of the mold plate 52 after curing, it is possible to obtain the lens sheet 11a (lens layer 11) in which the flat part 114 having the flat surface 114f, recess 114g and step part 114h is formed at each edge (only part of edges illustrated in corresponding drawing) in the screen up/down direction and screen left/right direction, as shown in FIG. 10(C). It is sufficient for the flat surface 114f to be formed at least partly in the flat part 114 provided to the lens layer 11 as in the present embodiment, and it is not limited to an embodiment establishing all as the flat surface 114f.

When preparing the reflective screen 10 using the lens layers 11 made by individually dividing from this lens sheet 11a, and joining the support plate 30 via the junction layer 40, more resin is filled between the recess 114g and step part 114h formed in the flat part 114 and the support plate 30 (refer to FIGS. 2 and 9), compared to the portion of the flat surface 114f. For this reason, it is possible to further improve adhesion between the reflective screen 10 and support plate 30.

In addition, when pasting the mold plate 52 of the present embodiment to the surface of the roll main body 51a (refer to FIG. 5), since movement of the resin 53 filled in the gap of the joint between ends is obstructed by the protrusion 52c and bank part 52d, it hardly influxes to the side of unevenness forming the unit lens 111. For this reason, it is possible to more effectively suppress defects of part of the mold plate 52 peeling from the roll 51 during molding, part of the unevenness forming the unit lens 111 being filled by resin, and molding defects, etc. occurring.

The above-mentioned embodiment shows an example in which the flat parts 114 are formed at all four edges of the lens layer 11; however, it is not limited thereto. The flat part 114 of the lens layer 11 may be formed at either edge of the screen left/right direction (X direction) or screen up/down direction (Y direction). In addition, the flat part 114 may be formed at either one (+X direction or −X direction, +Y direction or Y direction) edge in the screen left/right direction and/or screen up/down direction. Furthermore, the positions of the edges forming the flat part 114 may be the above-mentioned combination.

In the thickness direction of the lens layer 11, (h1min−h2, refer to FIG. 2) defining the position of the flat surface f of the flat part 114 may all be identical in one reflective screen 10, or may differ according to the position of the edge. For example, the flat part 114 may be made to slope in accordance with changes in the lens height h0 of the unit lens 111 formed in the lens layer 11. More specifically, in the case of the lens height h0 of the unit lens 111 gradually lowering as approaching the lower direction (−Y direction) from the upper direction (+Y direction) of the screen, it may be sloped so as to lower the flat surface f of the flat part 114 formed at both ends in the screen left/right direction (X direction) approaching the lower direction from the upper direction of the screen.

In the reflective screen 10, a junction layer 40 of different forms may be used at each of a region where the unit lens 111 is formed and a region where the flat part 114 is formed. For example, an adhesive may be coated on the region where the unit lens 111 is formed to establish the junction layer 40, or double-sided tape may be pasted in a picture-frame shape to the region where the flat part 114 is formed to establish the junction layer 40.

The lens layer 11 of the reflective screen 10 is not limited to a circular Fresnel lens shape, and may be a form having a linear Fresnel lens shape in which the unit lenses 111 are arranged in the screen up/down direction, etc. along the screen surface. The light diffusion layer 13 is not limited to the form containing the diffusing agent of light in the resin serving as the base material, and may be a form in which matt finishing was conducted on the surface of the video source side (+Z side) of the resin serving as the base material. In addition, it may be a form on which the matt finishing was conducted on the surface of the video source side of the lens layer 11. In this case, it is possible to omit the light diffusion layer 13 as a unit layer. The junction layer 40 is not limited to an example coating the adhesive, glue, etc. on the back surface side of the reflective screen 10, and may be formed on the back surface side of the reflective screen 10, by pasting a sheet on which adhesive, glue, etc. is coated on the surface onto the back surface side of the reflective screen 10, and peeling off the sheet, for example.

The screen (display region) of the reflective screen unit 1 may be a rectangular shape in which the long side direction is the screen up/down direction (Y direction), when viewing from the observer O1 side (refer to FIGS. 1(A) and 1(B)) of the video source side (+Z side) in the usage state. In addition, the screen of the reflective screen unit 1 may be a square shape with each side equal in the screen left/right direction and screen up/down direction, when viewing from the observer O1 side of the video source side.

EXPLANATION OF REFERENCE NUMERALS

1 reflective screen unit
2 video source
10 reflective screen
11 lens layer
12 reflective layer
13 light diffusion layer
20 bezel
30 support plate
40 junction layer
50 roll plate
52 mold plate
100 video display device
111 unit lens
112 lens surface
113 non-lens surface
114 flat part
114*f* flat surface
114*g* recess
114*h* step part

The invention claimed is:

1. A reflective screen which observably displays by reflecting video light projected from a video source, the reflective screen comprising:
   a lens layer having a Fresnel lens shape in which a plurality of unit lenses are arranged; and
   a reflective layer which is formed on the unit lens of the lens layer, and reflects light,
   wherein the unit lens is convex towards a back surface side from a video source side in a thickness direction of the lens layer,
   wherein a flat part at which a part of a back surface side becomes a flat surface is formed in at least an edge of the lens layer, and
   wherein, in a thickness direction of the lens layer, a smallest lens height h1min of a lens height h1, which is a distance from a position that is a most video source side of the lens layer until a position that a most back surface side of the unit lens, and a height h2 which is a distance from the flat surface of the flat part until a position which is a most back surface side of the unit lens satisfy a relationship (h1min−h2)>0.

2. The reflective screen according to claim 1, wherein the flat surface of the flat part has a relationship of 10 μm≤(h1min−h2)≤90 μm, in the lens layer formed from a position that is a most back surface side of the unit lens until a position in front of the point that is most video source side of the unit lens.

3. The reflective screen according to claim 1, wherein the flat surface of the flat part has a relationship of 20 μm≤(h1min−h2)≤60 μm, in the lens layer formed from a position that is a most video source side of the unit lens until a position in front of the point that is most video source side of the lens layer.

4. The reflective screen according to claim 1, wherein the lens layer is an oblong rectangular shape viewed from a video source side, and
   wherein the flat part is formed in at least one edge on a long side of the lens layer.

5. The reflective screen according to claim 4, wherein the lens layer includes a first long side that is more to a lens surface side than an non-lens surface in an arrangement direction of the unit lens, and a second long side that is more to the non-lens surface side than the lens surface in the arrangement direction of the unit lens, and
   wherein the flat part is formed at one edge on the first long side.

6. The reflective screen according to claim 4, wherein the flat part is formed at an edge on a side separated from an optical center of a Fresnel lens shape of the lens layer.

7. The reflective screen according to claim 1, wherein the lens layer is an oblong rectangular shape viewed from a video source side, and
   wherein the flat part is formed in at least one edge of a long side of the lens layer and at least one edge of a short side of the lens layer.

8. A reflective screen unit comprising:
   the reflective screen according to claim 1;
   a bezel provided to a video source side of the reflective screen, and covering at least the flat part;
   a support plate provided to a back surface side of the reflective screen, and maintaining flatness of a screen of the reflective screen; and
   a junction layer provided between the reflective screen and the support plate, and joining the reflective screen and the support plate.

9. A video display device comprising:
   the reflective screen unit according to claim 8; and
   a video source which projects video light towards the reflective screen unit.

* * * * *